Figure 1:
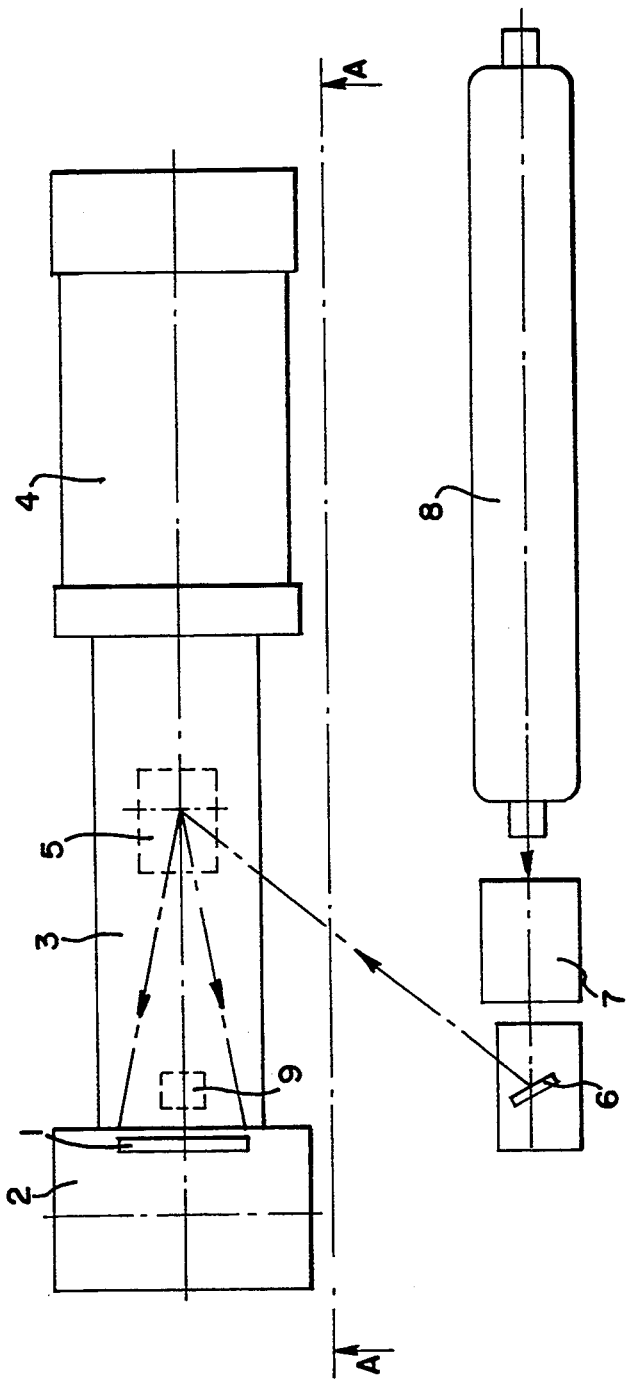

United States Patent [19]
Koivulehto

[11] Patent Number: 5,416,336
[45] Date of Patent: May 16, 1995

[54] LIGHT COLLECTOR AND READ-OUT APPARATUS FOR STIMULATED RADIATION IMAGE

[75] Inventor: Lauri Koivulehto, Evitskog, Finland

[73] Assignee: Orion-Yhtyma Oy, Espoo, Finland

[21] Appl. No.: 133,107

[22] PCT Filed: Apr. 16, 1992

[86] PCT No.: PCT/FI92/00114
§ 371 Date: Oct. 13, 1993
§ 102(e) Date: Oct. 13, 1993

[87] PCT Pub. No.: WO92/18899
PCT Pub. Date: Oct. 29, 1992

[30] Foreign Application Priority Data
Apr. 17, 1991 [FI] Finland ............... 911859

[51] Int. Cl.6 ............................................. G03B 42/02
[52] U.S. Cl. ...................... 250/584; 250/585; 250/586
[58] Field of Search ........................ 250/586, 585, 584

[56] References Cited

U.S. PATENT DOCUMENTS

| | | | |
|---|---|---|---|
| 3,975,637 | 8/1976 | Ikedo et al. | 250/591 |
| 4,582,988 | 4/1986 | Aagano | 250/585 |
| 4,629,890 | 12/1986 | Goto et al. | 250/586 |
| 4,736,102 | 4/1988 | Morrone | 250/585 |
| 4,742,225 | 5/1988 | Chan | 250/586 |
| 4,743,758 | 5/1988 | Chan et al. | 250/586 |
| 4,829,180 | 5/1989 | Goto et al. | 250/586 |
| 4,922,102 | 5/1990 | Katayama | 250/585 |

FOREIGN PATENT DOCUMENTS

92/18899  10/1992  WIPO ................ 250/586

*Primary Examiner*—Constantine Hannaher
*Attorney, Agent, or Firm*—Dressler, Goldsmith, Shore & Milnamow, Ltd.

[57] ABSTRACT

A radiation image read-out apparatus which comprises an optical system for exposing a stimulable phosphor plate (1) which contains a latent radiation image to a stimulating beam, and a light collector (3) for directing the stimulated light generated in the phosphor plate (1) to a photodetector (4), for example, a photomultiplier tube. Such read-out apparatuses often have the disadvantage that sufficient light cannot be collected into the photodetector. This problem has been solved by using a shiny mirror tube as the light collector.

4 Claims, 1 Drawing Sheet

U.S. Patent

May 16, 1995

5,416,336

LIGHT COLLECTOR AND READ-OUT APPARATUS FOR STIMULATED RADIATION IMAGE

The invention relates to a radiation image read-out apparatus which comprises an optical system for exposing a stimulable phosphor plate which contains a latent radiation image to a stimulating beam and for directing the stimulated light emitted from the phosphor plate of a light guide system to a photodetector, e.g. a photomultiplier tube.

There are materials having the capacity to become excited under the effect of radiation energy to which they are exposed, such as X-ray, ultraviolet, or gamma radiation. The absorbed radiation energy may contain information, for example a latent radiation image, which can be read out with the aid of stimulating radiation, such as a laser beam within the range of visible light, by recovering the light emitted from the material and by converting it into an image. One method based on this radiation image, i.e. RIM, technology is X-ray photography, in which radiation directed through the object to be photographed, modified by absorption into the object, is focussed on an excitable and later stimulable phosphor layer on the plate, and the plate thus exposed is read by means of a beam stimulating it, such as a laser beam, in order to produce an image on a photodetector, such as a photomultiplier tube.

The reading out of a radiation image thus takes place by exposing a stimulable phosphor plate which contains a latent radiation image to a stimulating beams and the stimulated light thus produced is collected into a photodetector by means of a light guide. The objective of the light collection is that a maximum amount of stimulated light extracted by the stimulating beam should be transferred to the light guide. The problem with this is that a large proportion of the stimulated light is emitted in directions in which it will not impinge against the light guide in such a way that it would become transferred to the photodetector.

The light guide is usually a member, such as a bent plate, formed from a material transparent to light, such as acrylic plastic, one end of the plate being connected to the photodetector and the other end being placed close to the point at which the stimulating beam impinges against the phosphor plate. The laser beam impinging against the surface of the phosphor plate stimulates light, which will be emitted in all directions. The objective is that as large a proportion as possible of the light emitted from the phosphor plate can be collected into the light guide. However, one single light guide is not capable of collecting more than a small proportion of the light emitted from the phosphor plate.

In U.S. Pat. No. 4,346,295, an effort has been made to solve the above-mentioned problem by placing a mirror surface close to the point at which the stimulating beam impinges against the phosphor plate, in such a manner that the mirror surface will reflect as much of the stimulated light as possible to the receiving end of the light guide. FIGS. 11 and 12 of the same publication depict an apparatus in which stimulated light is detected by using two photodetectors. The light is transmitted to the photodetectors by two light guides. In front of the photodetectors there are preferably arranged color filters which will prevent the access of stimulating light to the photodetectors and will allow the light emitted from the phosphor plate to pass through. However, the reflecting mirror also reflects stimulating light, which will weaken the image. Also, the use of two photodetectors is more expensive than the use of one.

Finnish patent application 903798 discloses a radiation image read-out apparatus in which the light guide system comprises two light guides or light-guide components the receiving ends of which have been arranged close to the point at which the stimulating beam impinges against the phosphor plate, and the output ends have been arranged in connection with the receiving end of one and the same photodetector. Thus the principle is that the light is collected on several guides but is directed to a common photodetector. Thereby the use of mirrors and extra photodetectors is avoided.

The radiation image read-out apparatus of the type referred to above is suitable for the reading out of a phosphor plate treated by any stimulation method. It is, however, preferable that the optical system for exposing the phosphor plate to a stimulating beam operates according to the scanning principle. In this case the system comprises, for example, a moving member which conveys the phosphor plate forward past the stimulating beam impinging against it. At the same time the optics move the stimulating beam back and forth in a direction transverse to the direction of travel of the phosphor plate, so that the entire phosphor plate will be scanned by the stimulating beam.

The known light guides or light guide components are manufactured of a homogenous material which is transparent to the light emitted from the stimulable phosphor, such as transparent thermosetting plastic resin, such as acrylic resin, or glass, such as quartz glass. It is known to make light guides from acrylic plate by cast-forming.

The present invention replaces the prior-art light guide system made up of an acrylic plate. It is an object of the invention to provide a radiation image read-out apparatus in which a maximal proportion of the stimulated light produced in the phosphor plate can be collected into the light guide system and via it into the photodetector. It is also an object of the invention to provide a light collection and light detection system which operates with minimal disturbance. The invention also aims at a maximally simple and inexpensive apparatus to achieve the above-mentioned objectives.

The essential characteristics of the invention are presented in the accompanying claims.

The invention relates to a mirror surface which serves as a light collector and which surrounds the source of light and reflects the light to the photodetector. The simplest such surface is a metal cylinder, i.e. a tube, which is polished on the inside. A converging cone does not work equally well, since part of the light is reflected back by it. A widening cone, for its part, is inconvenient, since it presupposes a wide-area photodetector. Thus a mirror collector is especially suitable for the collection of light from small areas.

The advantage of an acrylic collector is the progression of light almost without loss, owing to the total reflection. The disadvantages of acrylic include poor geometrical efficiency (the stimulating beam cannot be conveyed through the acrylic), the risk of reflection back from that end of the acrylic which is close to the area to be read out, and the problems of fastening and polishing. All of those parts necessary for the fastening which touch the acrylic will weaken the total reflection. The outermost surface of the acrylic will melt during polishing, and therefore the polishing is usually handwork of a demanding nature.

The metal mirror according to the invention provides an improvement with respect to all of the above-mentioned disadvantages of the acrylic collector:

1) Geometric efficiency is improved, since the collection will be successful also in the area to be read out;

2) No surface which causes reflection back is needed in the vicinity of the area to be read out;

3) The polishing of metal is easy;

4) The fastenings will not deteriorate the reflection capacity, since the reflecting surface is on the inside.

The metal mirrors may be made mutually similar with high precision and be fastened very stably, in which case any errors in the consistency of the light collection can be compensated for by a correction, corresponding to the geometry of the collector, which is to be made (for example digitally) in connection with the read-out (or later) and which need not be adjusted separately to each apparatus/collector pair.

In accordance with the invention, the collector used is a shiny mirror, preferably a round tube, preferably an aluminum tube, with a shiny inner surface. To facilitate the polishing, the collector may be assembled from open parts, such as two tube halves.

Another possible structure is a clear acrylic tube the smooth outer surface of which is covered with a shiny metal coating.

Since the intensity of the stimulating light is very high compared with the stimulated light, the stimulated light must be filtered off at a point before the photodetector. It is preferable to place such a filter at a point between the outlet end of the light guides and the receiving end of the photodetector.

Although the invention as such does not restrict the selection of the photodetector, it is usually indispensable, because of the required sensitivity, to use a photomultiplier tube.

Figure 2:
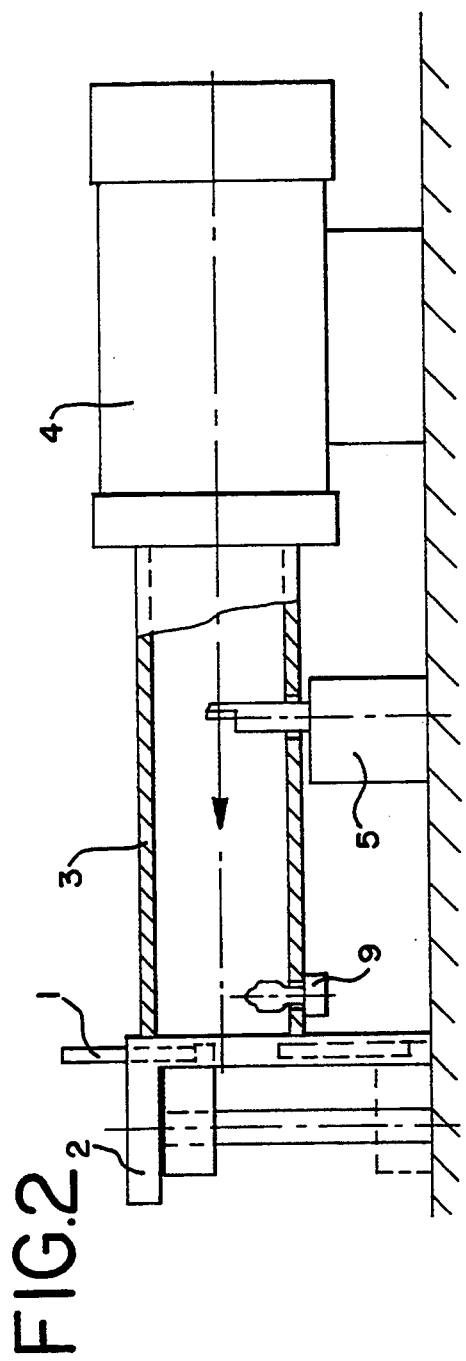

FIG. 1 depicts a top view of one radiation image read-out apparatus according to the invention, and FIG. 2 is a representation of FIG. 1 through A—A.

The read-out apparatus comprises an optical system for exposing to a stimulating beam a stimulable phosphor plate 1 which contains a latent radiation image. The stimulating beam impinges against the phosphor plate 1 and generates stimulated radiation emitted from its surface, the radiation impinging against the receiving end of the light collector 3. The stimulating beam is preferably a laser beam. The light collector 3 is preferably a mirror tube, e.g. an aluminum tube, which is circular in cross section and shiny on its inner surface, its longitudinal axis being at a substantial angle, e.g. a right angle, to the surface of the phosphor plate 1. The stimulating beam is introduced via the mirror tube 3, and at least on average approximately parallel to the longitudinal direction of the mirror tube, to the phosphor plate 1.

The stimulated light travels along the light collector made up of this mirror tube 3 to its outlet end, which is arranged in connection with the receiving end of the photomultiplier tube 4.

The stimulating beam scans the phosphor plate 1 in one direction in such a manner that the moving member 2 conveys the phosphor plate 1 past the stimulating beam impinging against it, the optics being made up of, for example, a laser beam source 8, a telescope 7, a deflection mirror 6, and a mirror galvanometer 5, which moves the stimulating beam back and forth. In this manner the phosphor plate 1 is in its entirety exposed to the stimulating beam.

FIG. 2 shows a side elevation of the apparatus, in direction A—A of FIG. 1. The phosphor plate 1 inside a cassette is moved up and down by means of a cassette conveyor 2. The stimulating beam is moved or scanned in another direction by means of a mirror galvanometer back and forth across the plate 1. To achieve the arrangement of the invention, the mirror of this mirror galvanometer 5 is placed inside the mirror tube 3, at a distance from the phosphor plate, to reflect the incoming beam towards the phosphor plate. The figures also show the scanning light 9, which will erase the plate, when necessary.

The radiation image read-out apparatus according to the invention has the advantage that the light collection system achieved is less expensive, smaller in size, and simpler than the conventional systems provided with two light guides, but is equally efficient. The system is at its most advantageous when the scanning amplitude of the laser beam is relatively narrow, as for example when an intraoral X-ray picture plate cassette is used.

I claim:

1. A radiation image read-out apparatus which comprises an optical system for exposing a stimulable phosphor plate (1) which contains a latent radiation image to a stimulating beam and a light collector for directing the stimulated light generated in the phosphor plate (1) to a photodetector (4) in which apparatus the light collector is a mirror tube which is shiny on any of its inwardly oriented surfaces and through which the stimulating beam impinges against the phosphor plate, characterized in that the longitudinal direction of the mirror tube (3) is at a substantial angle to the surface of the phosphor plate (1) and that the orientation of the stimulating beam is at least approximately parallel to the mirror tube (3) and scans across the phosphor plate (1) by means of a mirror galvanometer (5) located inside the mirror tube at a distance from the phosphor plate.

2. A radiation image read-out apparatus which comprises an optical system for exposing a stimulable phosphor plate (1) which contains a latent radiation image to a stimulating beam and a light collector for directing the stimulated light generated in the phosphor plate (1) to a photodetector (4) in which apparatus the light collector is a round mirror tube which is shiny on any of its inwardly oriented surfaces and through which the stimulating beam impinges against the phosphor plate, characterized in that the longitudinal direction of the mirror tube (3) is perpendicular to the surface of the phosphor plate (1) and that the orientation of the stimulating beam is at least approximately parallel to the mirror tube (3) and scans across the phosphor plate (1) by means of a mirror galvanometer (5) located inside the mirror tube at a distance from the phosphor plate.

3. A radiation image read-out apparatus in accordance with claim 2 in which the mirror tube (3) is made of aluminum.

4. A radiation image read-out apparatus which comprises an optical system for exposing a stimulable phosphor plate (1) which contains a latent radiation image to a stimulating beam and a light collector for directing the stimulated light generated in the phosphor plate (1) to a photodetector (4) which optical system comprises a moving member (2) that conveys the phosphor plate (1) past the stimulating beam impinging against it and optics (9) which at the same time moves the stimulating beam substantially back and forth transversally to scan the phosphor plate (1) with a stimulating beam and in which apparatus the light collector is a mirror tube which is shiny on any of its inwardly oriented surfaces and through which the stimulating beam impinges against the phosphor plate, characterized in that the longitudinal direction of the mirror tube (3) is at a substantial angle to the surface of the phosphor plate (1) and that the orientation of the stimulating beam is at least approximately parallel to the mirror tube (3) and scans across the phosphor plate (1) by means of a mirror galvanometer (5) located inside the mirror tube at a distance from the phosphor plate.

* * * * *